March 2, 1954 — B. SHERMAN — 2,670,652
DOUBLE MONOCHROMATOR
Filed Nov. 14, 1952
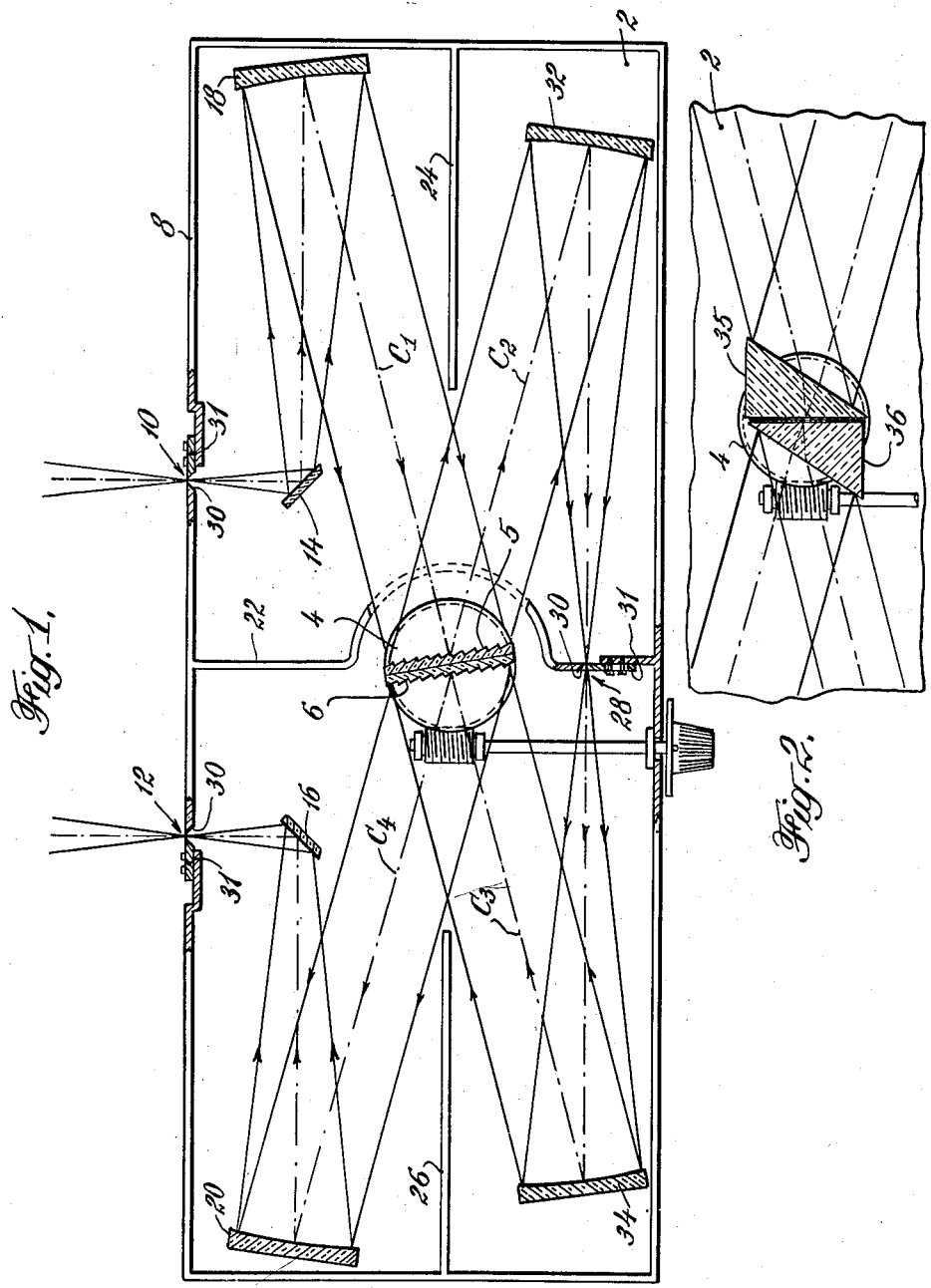
INVENTOR
BENNETT SHERMAN Patented Mar. 2, 1954

2,670,652

UNITED STATES PATENT OFFICE 2,670,652

DOUBLE MONOCHROMATOR

Bennett Sherman, Astoria, N. Y., assignor to Farrand Optical Co., Inc., New York, N. Y., a corporation of New York Application November 14, 1952, Serial No. 320,531

10 Claims. (Cl. 88—14)

This invention relates to monochromators. The invention provides a double monochromator in which two dispersing elements, one for each half of the instrument, are mounted back to back on a common rotating table inside a quadrilateral at whose angles are positioned four concave mirrors for collimating and focusing purposes. By proper positioning of these mirrors in accordance with the invention, the two halves of the instrument track together throughout the range of wave lengths available by rotation of the dispersing elements on the table, which is the only movable element necessary to the instrument, and with reflection-type gratings a linear relation is obtained between the angular position of the table and the wave length passed through the entire instrument. In a preferred embodiment of the invention spherical mirrors are employed, all of the same radius of curvature and all operated at off-axis angles of equal magnitude but of successively opposite sign, whereby the cancellation of certain oblique aberrations such as coma is obtained.

The invention will now be further described in conjunction with the accompanying drawings in which:

Fig. 1 is a diagrammatic plan view of a double monochromator according to the invention; and Fig. 2 is a fragmentary view similar to that of Fig. 1 illustrating the use of prisms instead of diffraction gratings as dispersing elements.

In the monochromator of the drawings a base 2 provides support to a rotating table 4 on which are mounted dispersing elements such as the plane reflection gratings 5 and 6 shown in Fig. 1 or the half prisms 35 and 36 shown in Fig. 2. The base also supports four collimating and focusing mirrors 18, 20, 32 and 34, entrance, middle and exit slits generally indicated at 10, 28 and 12 and plane "Newtonian" mirrors 14 and 16. The table 4 preferably rotates about a vertical axis, and the gratings are mounted back to back on the table with their rulings parallel to its axis of rotation and preferably with the planes of the rulings as near as may be to that axis.

The shape of the rulings is much exaggerated in the drawings in order to indicate that the gratings are mounted on the table in the same sense, i. e. the right-hand side of each grating as ruled is on the right of an observer facing that grating. Observance of this condition insures that on both gratings light of a given wave length incident at a given angle will be diffracted through the same angle. The comparable mounting for two reflecting half prisms is shown in Fig. 2.

An outer casing 8 provides a box-like enclosure to the instrument which also includes a top cover not shown. The entrance and exit slits are conveniently provided in the casing and cooperate with plane mirrors 14 and 16 in handling the divergent and convergent bundles associated with the concave mirrors 18 and 20. If 10 is the entrance slit and 12 the exit slit, mirror 18 is the collimating mirror for the first half of the instrument (extending as far as slit 28), and mirror 20 is the focusing mirror for the second half of the instrument. Light can however be sent through the instrument in either direction.

A central light shield 22 and additional light shields 24 and 26 minimize the effect of scattered radiation within the instrument. In the embodiment shown the middle slit 28 is supported from the light shield 22. The slits may include each a fixed jaw 30 and a movable jaw 31.

Mirrors 18, 32, 34 and 20 are positioned at the corners of a quadrilateral which circumscribes the table in such a fashion that mirrors 18 and 34 are in line with the gratings and that mirrors 32 and 20 are also in line with the gratings. The rotating table is thus located substantially at the intersection of the diagonals of the quadrilateral. Adherence to this criterion permits the instrument to "track," so that for any angular position of the table the light from mirror 34 which is incident on the grating 6 possesses the same angle of incidence at that grating as the light incident on grating 5 from mirror 18. Similarly by this criterion the mirror 20 selects at full aperture from the various parallel bundles produced by grating 6 that bundle which has been diffracted through the same angle as the angle through which is diffracted by grating 5 the parallel bundle intercepted at full aperture by mirror 32. By selection at "full aperture" is meant that the mirror 20, which like the other mirrors is for reasons of economy preferably made no larger than necessary to intercept the largest beam of parallel light which the gratings as aperture stop of the instrument can handle, is positioned to accept a full beam defined by the grating 6, without loss by vignetting at its edges.

Slit 28 is positioned to coincide with the image of the bundle so intercepted by mirror 32, and slit 12 and mirror 16 are positioned so that slit 12 coincides with the image of the bundle so intercepted by the mirror 20.

The middle slit may be dispensed with, but even without a middle slit mirror 34 accepts at full aperture only light of the narrow range of wave lengths whose complete diffracted bundles are intercepted at full aperture by the mirror 32. Without a middle slit other wave lengths reflected from the mirror 32 are intercepted by the mirror 34 in progressively decreasing amounts as a result of vignetting at both of the mirrors 32 and 34.

Across the planes of slits 28 and 12 the mirrors 32 and 20 of course focus spectra of the images respectively of slits 10 and 28, but these are of decreasing intensity on either side of the images formed by light of the wave length whose parallel bundles are intercepted at full aperture by mirrors 32 and 20. The locations of these images of maximum intensity are determined by the orientation of the mirrors 32 and 20, i. e. by their angular positions about axes parallel with the axis of rotation of the table and passing through their own vertices. The slit images in the planes of slits 28 and 12 are moreover of increasing aberrations on either side of the images of maximum intensity, provided mirrors 32 and 20 are respectively oriented to operate at off-axis angles equal in magnitude but opposite in sign to those applying to mirrors 18 and 34 respectively, in accordance with the invention as applied to instruments employing spherical mirrors for collimating and focusing purposes.

The off-axis angle at which the spherical mirrors are used may be conveniently defined for each of these mirrors as one-half the angle between the chief ray, before and after its reflection at the mirror, of the parallel bundle which is reflected at the mirror and which is focused actually or virtually on the associated slit. The chief rays of the four collimated bundles in Fig. 1 are labeled $C_1$, $C_2$, $C_3$ and $C_4$. It is evident of course that the off-axis angle varies among the rays of the various parallel bundles associated with each of the four mirrors.

In a preferred embodiment of the invention illustrated in Fig. 1, four concave spherical mirrors of the same radius of curvature are employed, all operated at off-axis angles of the same magnitude, which is made as small as convenient. By operating the mirror 32 at an off-axis angle equal in magnitude but opposite in sign to that applying to mirror 18, certain oblique aberrations developed by those two mirrors are cancelled in the image formed at the middle slit. Similarly operation of mirrors 34 and 20 at equal but opposite off-axis angles cancels such aberrations in the image formed at the exit slit 12.

To minimize the off-axis angle, the middle slit 28 is located as close to the turntable as convenient. For satisfactory operation, the spherical mirrors should have a focal length at least four times the maximum cross sectional dimension of the collimated beams which they are to handle. The cross section of the collimated beams is specified by the gratings, which are preferably approximately square and which act as the aperture stop of the instrument.

In embodiments employing spherical mirrors of the same radius of curvature operated at equal off-axis angles, location of the middle slit specifies both in bodily location and in orientation the positions of the second and third mirrors counting from the entrance slit, Nos. 32 and 34 in Fig. 1. It also specifies the off-axis angle at which the mirrors will operate and the diffraction angle at which the gratings will be used. The second and third mirrors 32 and 34 must both be distant from the middle slit by their focal lengths, which are equal, and both must be so oriented that the chief ray of the bundles passing between them and the gratings 5 and 6 will pass through the middle slit, which is collinear with mirrors 32 and 34. Mirrors 32 and 34 are therefore separated by the sum of their focal lengths, and are located at substantially mirror image positions of each other in the plane passing through the axis of the table and the middle slit. This mirror image plane is equally inclined to the collimated beams between the first and second concave mirrors and the dispersing element for the first half of the instrument. The diffraction angles, i. e. the angle between the beams incident on the gratings and the resulting diffracted beams which are selected by the mirrors 32 and 20 for focusing on the slits 28 and 12 respectively, will be four times the off-axis angle in view of the equality of the off-axis angles at mirrors 32 and 34 and in view of the requirement that the collimated beams be parallel in pairs. The off-axis angles are equal in magnitude at mirrors 32 and 34 in view of the fact that the chief ray between those mirrors passing through the middle slit and the chief rays between those mirrors and the gratings form an isosceles triangle, since the mirrors are of equal focal length. The design of the instrument is thus specified except for the physical location of the mirrors 18 and 20 and of the mirrors 14 and 16 and slits 10 and 12 which go therewith. Mirrors 18 and 20 may be located at any desired distances from the table 4, but their orientations with respect thereto are specified by the requirement that they be operated at off-axis angles equal in magnitude but opposite in sign to those applying at mirrors 32 and 34, respectively.

The instrument of the invention may be constructed with focusing mirrors of other types. Off-axis paraboloidal mirrors may for example be used without particular precautions to provide equality of the off-axis angles thereat. Even with spherical mirrors a construction according to the invention is possible in which the spherical mirrors are of different radii of curvature. For example, the collimating and focusing mirrors of the first half of the instrument can be selected of one radius of curvature and operated at equal but opposite angles to cancel their oblique aberrations, while the collimating and focusing mirrors of the second half of the instrument are of another radius of curvature. Such a construction appears to have no particular merit, but is intended to be comprehended within the scope of the appended claims.

Of course the concave mirrors can be made oversized, i. e. larger than necessary to handle the collimated beams over the narrow range of wave lengths which are destined by the width of the exit slit to get through the instrument, although there is no object to be gained by making them so. Indeed if the middle slit is omitted, oversizing of the mirrors, especially the first three, will result in loss of purity of the light at the exit slit. As used in the appended claims the "distance" or "separation" between the concave mirrors of the instrument refers to the useful portions thereof.

While the collimated beams associated with the four concave mirrors should be parallel in pairs, it is not necessary that they be collinear in pairs, and Fig. 2 shows that when prisms are employed they are in general not so collinear.

In the appended claims the dispersing elements are recited as being substantially identical. Of course it is not necessary that the gratings or prisms be geometrically identical in all respects. In the case of gratings, it is important that the rulings be equally spaced on both, and in the case of prisms the material of the prisms and their prism angles should be the same. The prisms are to be mounted on the table with their edges parallel to the axis of rotation of the table.

I claim:

1. A double monochromator comprising a base, a table rotatable with respect to the base, two substantially identical dispersing elements supported back to back on the table, entrance and exit slits fixed with respect to the base, and four concave mirrors arranged on the base, said mirrors being disposed at the angles of a quadrilateral circumscribing the table with the table disposed substantially at the intersection of the diagonals of said quadrilateral, the separation of a second and a third of said mirrors located at the ends of a side of said quadrilateral being substantially equal to the sum of their focal lengths, said entrance slit being optically distant from a first of said mirrors adjacent said second mirror by the focal length of said first mirror, and said exit slit being optically distant from the fourth of said mirrors by the focal length of said fourth mirror.

2. A double monochromator comprising a base, a table rotatable with respect to the base, two substantially identical dispersing elements supported back to back on the table, entrance and exit slits fixed with respect to the base, and four concave mirrors arranged on the base, said mirrors being disposed at the angles of a quadrilateral circumscribing the table with the table disposed substantially at the intersection of the diagonals of said quadrilateral, the separation of a second and a third of said mirrors located at the ends of a side of said quadrilateral being substantially equal to the sum of their focal lengths, said entrance slit being optically distant from a first of said mirrors adjacent said second mirror by the focal length of said first mirror, and said exit slit being optically distant from the fourth of said mirrors by the focal length of said fourth mirror.

3. A double monochromator comprising a base, a table rotatable with respect to the base, two substantially identical dispersing elements supported back to back on the table, entrance and exit slits fixed with respect to the base, and four concave spherical mirrors arranged on the base, said mirrors being disposed at the angles of a quadrilateral circumscribing the table with the table disposed substantially at the intersection of the diagonals of said quadrilateral, the separation of a second and a third of said mirrors located at the ends of a side of said quadrilateral being substantially equal to the sum of their focal lengths, said entrance slit being optically distant from a first of said mirrors adjacent said second mirror by the focal length of said first mirror, and said exit slit being optically distant from the fourth of said mirrors by the focal length of said fourth mirror, said first and second mirrors being operated at off-axis angles equal in magnitude but opposite in sign, and said third and fourth mirrors being operated at off-axis angles equal in magnitude but opposite in sign.

4. A double monochromator comprising a base, a table rotatable with respect to the base, two substantially identical dispersing elements supported back to back on the table, entrance and exit slits arranged on the base, and four concave mirrors arranged on the base, said mirrors being disposed at the angles of a quadrilateral circumscribing the table with the table disposed substantially at the intersection of the diagonals of said quadrilateral, the distance between a second and a third of said mirrors being substantially equal to the sum of their focal lengths, said entrance slit being so positioned relative to a first of said mirrors adjacent said second mirror that a beam of collimated light filling one of said dispersing elements as aperture stop and parallel to the line defined by the diagonal of the quadrilateral on which said first mirror lies will be brought to a focus by said first mirror at said entrance slit, said second mirror being oriented to cast onto said third mirror a diverging bundle derived by reflection at said second mirror of a bundle of light from said entrance slit diffracted at a first one of said dispersing elements, said third mirror being oriented to cast onto the other of said elements as a parallel bundle the light received by said third mirror from said second mirror, said exit slit being positioned at the focus in the fourth of said mirrors of the bundle from said third mirror diffracted by said second element through the same angle as the bundle from said first mirror diffracted by said first element onto said second mirror.

5. A double monochromator comprising a base, a table rotatable with respect to the base, two substantially identical dispersing elements supported back to back on said table, entrance and exit slits arranged on the base, four concave spherical mirrors arranged on the base, said mirrors being positioned successively at the angles of a quadrilateral circumscribing said table with the table disposed substantially at the intersection of the diagonals of said quadrilateral, a first and a second of said mirrors at successive angles of said quadrilateral having equal focal lengths and the third and fourth of said mirrors having equal focal lengths, said first and second mirrors being operated at off-axis angles of equal magnitude and opposite sign, said third and fourth mirrors being operated at off-axis angles of equal magnitude and opposite sign, said exit slit being located at the image of said entrance slit as successively formed in said four mirrors by light of the wave length which when incident on said dispersing elements from said first and third mirrors is diffracted through the angle separating the diagonals of said quadrilateral.

6. A double monochromator comprising a base, a table rotatable with respect to the base, two plane reflection-type diffraction gratings of the same ruling spacing mounted back to back on the table with their planes parallel and with their rulings parallel to the axis of rotation of the table, entrance, middle and exit slits arranged on the table, four spherical mirrors of the same radius of curvature, said mirrors being disposed at the angles of a quadrilateral circumscribing the table with the table disposed substantially at the intersection of the diagonals of said quadrilateral, said middle slit being positioned on the base adjacent the turntable, a second and a third of said mirrors at the ends of one side of said quadrilateral being located each at its focal distance from said middle slit and collinearly of said middle slit and of the other of said second and third mirrors, each of said second and third mirrors being oriented to reflect at the central region thereof to said middle slit a ray from the ruling on said gratings adjacent the axis of said table, a first one of said mirrors adjacent said second mirror being positioned to intercept a collimated beam from one of said gratings parallel to a collimated beam passing between the other of said gratings and said third mirror, and the fourth of said mirrors being positioned to intercept a collimated beam from the other of said gratings parallel to a collimated beam passing between the second of said mirrors and the first of said gratings, said entrance and exit slits being located respectively on the focal surfaces of said first and fourth mirrors, said first and fourth mirrors being oriented and said exit and entrance slits being so positioned that the chief rays passing between said entrance and exit slits and said first and fourth mirrors respectively are parallel to the chief ray passing between said second and third mirrors.

7. A double monochromator comprising a base, a table rotatable with respect to the base, two substantially identical dispersing elements mounted back to back on the table, four concave mirrors disposed in pairs collinearly of said table with their concave sides facing said table, and entrance, middle and exit slits, said entrance slit being so positioned with respect to a first one of said mirrors that light diverging from said entrance slit is transformed by said first mirror into a parallel bundle incident on one of said elements, a second and a third of said mirrors having such radii of curvature that the sum of their focal lengths is equal to the separation therebetween, said middle slit being located at the image of maximum intensity of said entrance slit as produced successively by said first mirror, one of said elements and by said second mirror, said third mirror being positioned to intercept at full aperture the beam of light from said second mirror imaged at said middle slit and being oriented to reflect onto the other of said elements the beam of light so intercepted, said exit slit being positioned at the image of said middle slit of maximum intensity formed by said third mirror, the other of said dispersing elements and said fourth mirror.

8. A double monochromator comprising four concave mirrors disposed at the angles of a quadrilateral, a rotatable table disposed substantially at the intersection of the diagonals of said quadrilateral, two substantially identical dispersing elements supported back to back on the table, and entrance and exit slits in fixed positions with respect to the quadrilateral, the distance between a second and a third of said mirrors at ends of a side of said quadrilateral being substantially equal to the sum of their focal lengths, said entrance slit being so positioned that a beam of collimated light filling one of said dispersing elements as aperture stop and parallel to the line defined by the diagonal of the quadrilateral on which said first mirror lies will be brought to a focus by said first mirror at said entrance slit, said second mirror being oriented to cast onto said third mirror a diverging bundle derived by reflection at said second mirror of a bundle of light from said entrance slit diffracted at one of said dispersing elements, said third mirror being oriented to cast onto the other of said elements as a parallel bundle the light received by said third mirror from said second mirror, said exit slit being positioned at the focus in said fourth mirror of the bundle diffracted from said second element through the same angle as the bundle diffracted by said first element onto said second mirror.

9. A double monochromator comprising a base, a table rotatable with respect to the base, two substantially identical dispersing elements supported back to back on said table, entrance and exit slits arranged on the base, four concave spherical mirrors of the same focal length arranged on the base, said mirrors being positioned successively at the angles of a quadrilateral circumscribing said table with the table disposed substantially at the intersection of the diagonals of said quadrilateral, said exit slit being located at the image of said entrance slit as successively formed in said four mirrors by light of the wave length which when incident on said dispersing elements from said first and third mirrors is diffracted through the angle separating the diagonals of said quadrilateral.

10. A double monochromator comprising a base, a table rotatable with respect to the base, two substantially identical dispersing elements supported back to back on the table, entrance and exit slits arranged on the base, four concave spherical mirrors of the same focal length arranged on the base, said mirrors being positioned at the angles of a quadrilateral circumscribing said table with the table disposed substantially at the intersection of the diagonals of said quadrilateral, said entrance slit being so positioned adjacent a first one of said mirrors that light passing through said entrance slit is transformed by said one mirror into a first parallel beam falling on one of said dispersing elements and limited by said one dispersing element as aperture stop, a second one of said mirrors being further positioned to intercept a second parallel beam derived from said first beam by diffraction at said one element through subtantially twice the angle through which is reflected at said first mirror the chief ray of said first beam, said second mirror being oriented to deviate through said angle the chief ray of said second beam, said third mirror being further positioned at twice its focal distance from said second mirror and oriented to reflect to the second of said elements by deviation through said angle the chief ray of said second parallel beam as reflected by said second mirror, said fourth mirror being further positioned to intercept a parallel beam derived at said other element by diffraction through twice said angle of the beam reflected by said third mirror to said other element, said fourth mirror being oriented to deviate the chief ray of the beam intercepted thereby through said angle.

BENNETT SHERMAN.

No references cited.